US011954656B1

(12) United States Patent
Garner, IV et al.

(10) Patent No.: US 11,954,656 B1
(45) Date of Patent: Apr. 9, 2024

(54) MANAGEMENT OF REQUESTS TO PROVIDER SYSTEMS FOR PERFORMING FUNCTIONS WITHIN A DISTRIBUTED COMPUTING SYSTEM

(71) Applicant: Wells Fargo Bank, N.A., San Francisco, CA (US)

(72) Inventors: Andrew J. Garner, IV, State Road, NC (US); Chris Theodore Kalaboukis, San Jose, CA (US); Rameshchandra Bhaskar Ketharaju, Hyderabad (IN); Joon Maeng, Newcastle, WA (US); Ramanathan Ramanathan, Bellevue, WA (US); Abhijit Rao, Irvine, CA (US); Andres J. Saenz, Cape Coral, FL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/160,187

(22) Filed: Jan. 27, 2021

(51) Int. Cl.
*G06Q 20/02* (2012.01)
*G06Q 20/38* (2012.01)

(52) U.S. Cl.
CPC ......... *G06Q 20/027* (2013.01); *G06Q 20/389* (2013.01)

(58) Field of Classification Search
CPC .................................................. G06Q 20/027
See application file for complete search history.

(56) References Cited

U.S. PATENT DOCUMENTS

| 9,514,343 | B1 | 12/2016 | Bolts |
| 10,257,270 | B2 | 4/2019 | Cohn et al. |
| 2001/0032113 | A1* | 10/2001 | Rudnick ............... G06Q 10/063 705/26.1 |
| 2007/0233510 | A1* | 10/2007 | Howes ............... G06Q 30/0601 705/26.1 |

(Continued)

FOREIGN PATENT DOCUMENTS

| WO | 2019142049 A1 | 7/2019 |
| WO | 2019246567 A1 | 12/2019 |

OTHER PUBLICATIONS

Arya et al., "Blockchain Enabled Trustless API Marketplace" Retrieved from https://arxiv.org/pdf/1812.02154.pdf, Dec. 5, 2018, 5 pp.

(Continued)

*Primary Examiner* — Edward Chang
(74) *Attorney, Agent, or Firm* — Shumaker & Sieffert, P.A.

(57) ABSTRACT

An example method includes identifying provider systems each configured to perform a function requested by a device, wherein the provider systems are associated with vendors that provide one or more of services, goods, or device skills, responsive to selecting a provider system, sending, to the provider system, the request to perform the function, after sending the request to the provider system, receiving, by the management system and from the provider system, provider response information associated with performance of the function, sending, by the management system and to the device, the provider response information associated with performance of the function, and initiating a payment of (Continued)

funds from a first financial system associated with the device to a second financial system associated with the provider system.

24 Claims, 5 Drawing Sheets

(56) References Cited

U.S. PATENT DOCUMENTS

| | | |
|---|---|---|
| 2009/0048968 A1* | 2/2009 | Bishop .................... G06Q 20/10 |
| | | 705/39 |
| 2009/0138564 A1* | 5/2009 | Beddus ................. H04L 69/329 |
| | | 709/206 |
| 2012/0046069 A1* | 2/2012 | Cupala .................... H04W 4/60 |
| | | 455/550.1 |
| 2015/0186964 A1* | 7/2015 | Vieira ................ G06Q 30/0611 |
| | | 705/26.4 |
| 2017/0178237 A1 | 6/2017 | Wong |
| 2018/0096175 A1* | 4/2018 | Schmeling ............ G06F 1/3206 |
| 2019/0102850 A1* | 4/2019 | Wheeler .............. G06Q 20/405 |
| 2020/0186568 A1 | 6/2020 | Erb et al. |

OTHER PUBLICATIONS

Miehle et al., "Toward a Decentralized Marketplace for Self-Maintaining Machines", 2019 IEEE International Conference on Blockchain (Blockchain), Jul. 14-17, 2021, pp. 431-438.

* cited by examiner

US 11,954,656 B1

MANAGEMENT OF REQUESTS TO PROVIDER SYSTEMS FOR PERFORMING FUNCTIONS WITHIN A DISTRIBUTED COMPUTING SYSTEM

TECHNICAL FIELD

The present disclosure relates to distributed computing systems.

BACKGROUND

In many instances, customers may use one or more computing devices to interact with servers or other systems that provide products and/or services. For example, a customer may use a computing device (e.g., smartphone, personal computer, automated teller machine) to access a server that is configured to provide various online banking or financial products and/or services.

SUMMARY

In general, this disclosure describes techniques for managing requests from devices (e.g., machines) to one or more provider systems (e.g., vendor systems and/or financial systems) for performing functions within a distributed computing system. For example, users of these devices may submit requests to obtain one or more services, goods, or even device skills to a management system, which may then identify one or more provider systems that are configured to provide these services, goods, and/or device skills. The management system may comprise a centralized or a distributed system, and may in various cases provide an ad-hoc digital marketplace or repository for functions that are offered by the provider systems. The devices may then obtain provider-served functions that are available via the marketplace that is provided by the management system. The management system thereby operates as a multi-function capability organizer between the devices and provider systems, such that the management system may be configured to manage the distribution of goods, services, and/or device skills associated with the respective functions to the appropriate entities (e.g., devices or other systems). In addition, the management system may be configured to initiate or coordinate the payment of funds associated with performed functions between financial systems associated with the devices and/or provider systems.

As one example, this disclosure is directed to a method that includes, responsive to receiving a request from a device to perform a function, identifying, by a management system comprising one or more processors, a plurality of provider systems that are each configured to perform the function, wherein the plurality of provider systems are associated with a plurality of vendors that provide one or more services, goods, or device skills, and wherein the request to perform the function is associated with at least one of the one or more services, goods, or device skills; responsive to selecting a provider system from the plurality of provider systems, sending, by the management system and to the provider system, the request to perform the function; after sending the request to the provider system, receiving, by the management system and from the provider system, provider response information associated with performance of the function to provide the at least one of the one or more services, goods, or device skills; sending, by the management system and to the device, the provider response information; and initiating, by the management system, a payment of funds from a first financial system associated with the device to a second financial system associated with the provider system that performed the function.

As another example, this disclosure is directed to a system that includes one or more processors and at least one computer-readable storage device. The at least one computer-readable storage device stores instructions that are executed by the one or more processors to: responsive to receiving a request from a device to perform a function, identify a plurality of provider systems that are each configured to perform the function, wherein the plurality of provider systems are associated with a plurality of vendors that provide one or more services, goods, or device skills, and wherein the request to perform the function is associated with at least one of the one or more services, goods, or device skills; responsive to selecting a provider system from the plurality of provider systems, send, to the provider system, the request to perform the function; after sending the request to the provider system, receive, from the provider system, provider response information associated with performance of the function to provide the at least one of the one or more services, goods, or device skills; send, to the device, the provider response information; and initiate a payment of funds from a first financial system associated with the device to a second financial system associated with the provider system that performed the function.

As another example, this disclosure is directed to a computer-readable storage device storing instructions that, when executed, cause at least one or more processor of a device to: responsive to receiving a request from a device to perform a function, identify a plurality of provider systems that are each configured to perform the function, wherein the plurality of provider systems are associated with a plurality of vendors that provide one or more services, goods, or device skills, and wherein the request to perform the function is associated with at least one of the one or more services, goods, or device skills; responsive to selecting a provider system from the plurality of provider systems, send, to the provider system, the request to perform the function; after sending the request to the provider system, receive, from the provider system, provider response information associated with performance of the function to provide the at least one of the one or more services, goods, or device skills; send, to the device, the provider response information; and initiate a payment of funds from a first financial system associated with the device to a second financial system associated with the provider system that performed the function.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
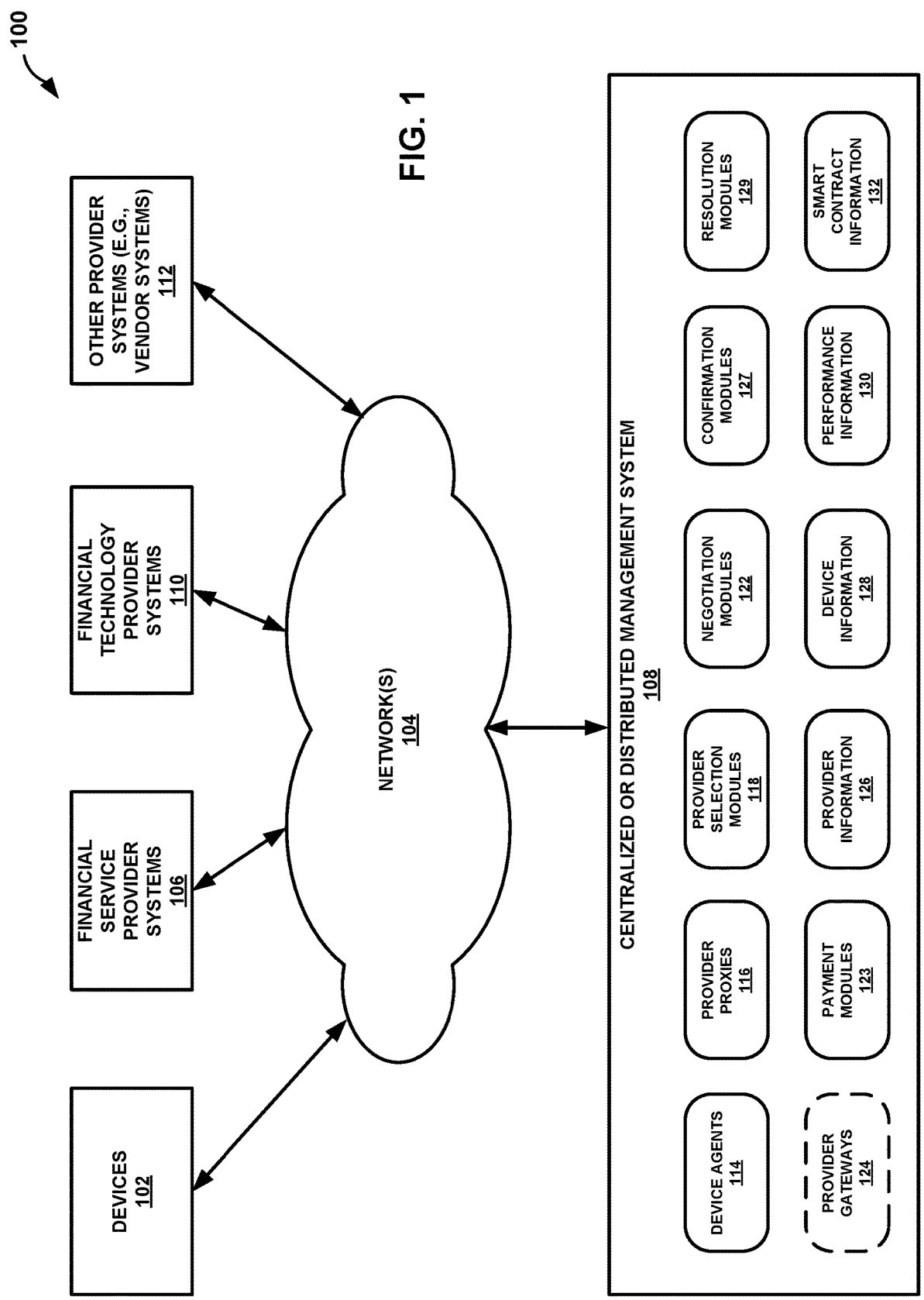
FIG. 1 is a block diagram illustrating an example management system that is configured to manage requests to one or more provider systems (e.g., vendor systems and/or financial systems) for performing functions within a distributed computing system, in accordance with techniques of this disclosure.

FIG. 1 is a block diagram illustrating an example management system 108 that is configured to manage requests from devices 102 (e.g., machines) to one or more provider systems (e.g., vendor systems and/or financial systems) 106, 110, 112 for performing functions within a distributed computing system 100, in accordance with techniques of this disclosure. As noted above, in many instances, customers or other users may use one or more computing devices, such as one or more devices 102 shown in FIG. 1, to interact with provider systems that provide products, services, and/or device skills, such as with one or more of financial service provider systems 106, financial technology provider systems 110, and/or other provider systems 112. Management system 108, which may comprise a centralized or distributed management system, may manage requests to provider systems 106, 110, and/or 112 for performing various functions, such as providing one or more services, products, and/or device skills to devices 102 or users of devices 102. Devices 102, management system 108, and provider systems 106, 110, 112 may communicate with each other via one or more networks 104, such as one or more wireless and/or wired networks. Any given customer or user may use or be associated with one or more of devices 102.

The components illustrated in FIG. 1 may comprise one or more physical or virtual components. For instance, in various examples, a device, system, or other entity shown in FIG. 1 may comprise a physical entity or machine (e.g., a computing device, a computer server, a quantum computer, a desktop computer, a tablet computer, a laptop computer, smartphone, etc.) and/or virtual entity or machine (e.g., virtual machine, application software in a computing machine, cloud computing system, etc.). In certain examples, a device, system, or other entity may include one or more computers that process information and/or devices with embedded computers such as, e.g., smartphones, television sets, radios, wireless headsets, digital cameras, global positioning system (GPS) based navigators, automated teller machines, and so forth. Some devices conduct a single function and others carry out multiple functions.

Management system 108 may be implemented as any suitable collection of one or more computing devices, machines, or systems, such as one or more server computers, workstations, mainframes, appliances, cloud computing systems, and/or other computing systems that may be capable of performing operations and/or functions described in accordance with one or more aspects of the present disclosure. Management system 108 may comprise a centralized or a distributed system. In some examples, management system 108 may comprise one or more physical entities, while in other examples, it may comprise one or more virtual entities (e.g., virtual machines). FIG. 1 illustrates only one particular example of management system 108, and many other examples of management system 108 may be used in other instances and may include a subset of the components shown in, or may include additional components not shown in, FIG. 1. Although not shown in FIG. 1, in certain cases, there may be multiple management systems 108 or instances of management systems 108 (e.g., one instance of management system 108 for each different type of supported operation system, device type/architecture, and the like).

As noted above, devices 102 may be configured to communicate with management system 108 and/or with provider systems 106, 110, 112 via one or more networks 104 within distributed computing system 100, such as by sending one or more requests to perform functions and subsequently receiving provider response information associated with performance of these functions. Functions as well as, e.g., cost, performance, availability, ratings, reliability, and/or quality can make up selection criteria. Thus, in some cases, the one or more requests may include or be associated with parameter values that may specify selection criteria related, e.g., to performance, accuracy, deliverables, cost, ratings, reliability, dates, pricing, and/or other criteria associated with the requested functions. Once a desired function is specified, the other parameters may come into the actual selection and negotiation of terms (e.g., as captured in a smart contract).

However, in many cases, devices 102 may not always have information indicating which provider systems 106, 110, 112 perform which functions, and different ones of provider systems 106, 110, 112 may perform different types of functions and be associated with different entities. For instance, in certain non-limiting examples, devices 102 may include a merchant point-of-sale device, which may be configured to accept requests to perform different banking functions. This point-of-sale device may be associated with merchant's bank. When a customer uses this merchant point-of-sale device to perform a financial transaction (e.g., banking function), the funds associated with the transaction may be reconciled between the merchant's bank and the customer's bank. The merchant's bank and the customer's bank may be examples of financial service provider systems 106. However, as will be described in further detail below, using the techniques disclosed herein, management system 108 may be configured to manage function requests from devices 102 with respect to any of provider systems 106, 110, 112, such that the performance of such functions is not limited to any particular one of provider systems 106, 110, 112.

According to the presently disclosed techniques, management system 108 may be configured to manage requests from devices 102 to one or more provider systems (e.g., vendor systems and/or financial systems) 106, 110, 112 for performing functions. Users of these devices 102 may submit requests to obtain one or more services, goods, or even device skills to management system 108, which may then identify one or more provider systems 106, 110, 112 that are configured to provide these services, goods, and/or skills. Management system 108 may, in certain examples, comprise one or more centralized systems. In other examples, management system 108 may comprise one or more distributed ledgers or blockchain systems that comprise one or more nodes, devices, servers, or other entities that are interconnected by one or more networks to form management system 108.

Management system 108 may serve an ad-hoc digital marketplace or repository for functions that are offered by provider systems 106, 110, 112. Devices 102 may then obtain provider-served functions that are available via the marketplace that is provided by management system 108. Management system 108 may thereby operate as a multi-function capability organizer between devices 102 and provider systems 106, 110, 112, such that management system 108 is configured to manage the distribution of goods, services, and/or skills associated with the respective functions to the appropriate entities (e.g., devices 102 or other systems). In addition, management system 108 may be configured to initiate or coordinate the payment of funds (e.g., digital currency) associated with performed functions.

Financial service provider systems 106 may include one or more systems (e.g., systems for banks, credit unions, brokerages, lenders, and the like) that provide one or more financial services to users. Financial technology provider systems 110 may include one or more systems that provide financial technologies or infrastructure to users or to other systems. Other provider systems 112 (e.g., vendor systems) may include any number of one or more other provider systems included in system 100. These provider systems 112 may be associated with providers (e.g., vendors) that provide one or more other types of services, goods, or device skills, which may or may not necessarily be related to financial-based services, goods, or device skills. Any of systems 106, 110, 112 may perform various functions to provide one or more goods, services, and/or skills to other systems or to devices 102. Although shown as different entities in FIG. 1, one or more of provider systems 106, 110, 112 may in some cases be integrated into one or more common/shared providers or vendors.

As one non-limiting example, a device included in devices 102 may operate as a multi-function cash register capable of performing different functions (e.g., cash register function, card reader function, automated teller machine (ATM) function), which are each owned or associated with a different one of financial service provider systems 106 and/or financial technology provider systems 110. When a customer requests a cash withdrawal via the multi-function cash register, the multi-function cash register may request performance of a cash withdrawal function via management system 108. As will be described in further detail below, management system 108 may identify one or more of financial service provider systems 106 and/or financial technology provider systems 110 that are configured to perform the requested cash withdrawal function, and based on a selection of one of these provider systems by the device, management system 108 may request performance of the function by the selected provider system, including the distribution of funds (e.g., digital currency) from the selected provider system to device 102 or one of provider systems 106, 108 that is associated with the device (e.g., with a user of the device such as a customer or the device owner).

As another non-limiting example, a device included in devices 102 may operate as a self-service kiosk or device capable of performing different functions (e.g., car washing functions, multi-function cash register functions). For instance, when a customer drives to the self-service device and requests a car wash, the device may request performance of this function via management system 108, and the request may include information about the customer's car (e.g., make/model). Because there are many different functions that the self-service device may perform, and because there are various different makes and models of cars that may be washed, provider selection modules 118 may identify one or more provider systems 112 that provide car wash functions. In particular, provider selection modules 118 may identify provider systems 112 that provide car wash services or instructions (e.g., skills) as to how to wash cars, and/or particular makes or models of cars. Based on a selection of one of these provider systems 112, management system 108 may request performance of the function by the selected provider system, including the distribution of services and/or skills to the device via device agents 114. Payment modules 123 may also initiate payment of funds from a financial system associated with the customer or owner of the device to a financial system associated with the selected provider system. In some cases, the self-service device may also be configured to re-stock certain consumables (e.g., soap, currency, wax) used by the device or the owner of the device, via management system 108. These examples will be further described below in reference to FIG. 2.

As shown in FIG. 1, management system 108 includes one or more device agents 114, one or more provider proxies 116, one or more provider selection modules 118, one or more negotiation modules 122, one or more confirmation modules 127, one or more resolution modules 129, one or more payment modules 123, one or more optional provider gateways 124, provider information 126, device information 128, performance information 130, and smart contract information 132. Device agents 114 may perform actions under the direction or control of devices 102. In some cases, each of device agents 114 may be associated with one or more of devices 102. In some examples, functionality provided by one or more of device agents 114 may be included in or provided by devices 102. Device agents 114 may be configured to provide one or more interfaces (e.g., communication interfaces) to devices 102 by management system 108.

Provider proxies 116 may be configured to serve as proxies for provider systems 106, 110, 112. In some cases, each of provider proxies 116 may be associated with one or more of provider systems 106, 110, 112. Provider proxies 116 may be configured to provide one or more interfaces (e.g., communication interfaces) to provider systems 106, 110, 112 by management system 108. Provider selection modules 118 may be configured to identify or select one or more of provider systems 106, 110, 112 for performance of one or more functions, based on interaction with devices 102. Negotiation modules 122 may be configured to perform negotiation operations (e.g., bidding operations, auction operations) associated with devices 102, management system 108, and/or provider systems 106, 110, 112 associated with the performance of various functions. These devices and/or provider systems may serve as candidate devices and/or provider systems for the performance of various functions. Negotiation modules 122 may store information associated with the bidding or auction operations in one or more of provider information 126, device information 128, performance information 130, and/or smart contract information 132. Payment modules 123 may be configured to perform payment operations, such as the initiation or coordination of fund payments between provider systems 106, 110 112 for the performance of functions. Optional provider gateways 124 may be configured to serve as gateways (e.g., payment gateways) to one or more of provider systems 106, 110, 112. In some cases, the functionality of provider gateways 124 may be included in payment modules 123. In some cases, provider gateways 124 may be external from management system 108. Further details of device agents 114, provider proxies 116, negotiation modules 122, payment modules 123, and provider gateways 124 will be provided below. In some examples, management system 108 may include only a subset of the components shown in FIG. 1.

Management system 108 also is configured to store various types of information. For example, as shown in FIG. 1, management system 108 may store provider information 126, device information 128, performance information 130, and smart contract information 132. As will be described in further detail below, provider information 126 includes various information about provider systems 106, 110, 112 (e.g., type of provider system, identification information, information associated with functions performed, cost information associated with supported functions, rating information and/or quality information based on performance of functions, current availability information, location information, and the like). This provider information 126 may be associated with supported services, goods, and/or device skills by provider systems 106, 110, 112. Device information 128 includes various information about devices 102 (e.g., type of device, identification information, information associated with requested functions, location information, and the like). Performance information 130 includes information regarding functions performed (e.g., entities associated with performed functions, details for performed functions, and the like). Performance information 130 may also include metrics or other information associated with performance (or non-performance) of functions by provider systems 106, 110, 112 and/or devices 102, such as information related to performance efficiency, timing, accuracy, reliability, pricing, and the like. Smart contract information 132 includes information associated with one or more contracts that may be formed between entities (e.g., between devices 102 and one or more of provider systems 106, 110, 112).

As will be described in further detail below, management system 108 may be configured to receive (e.g., via device agents 114), from a device of devices 102, a request to perform a function. Provider selection modules 118 may identify, based on the request, a group of provider systems 106, 110, 112 that are each configured to perform the function. This group of provider systems may comprise candidate provider systems that are associated with a group of vendors that provide one or more services, goods, or device skills to devices 102. The request to perform the function may be associated with at least one of the one or more services, goods, or device skills. In some cases, as will be described in further detail below, the group of provider systems may also include one or more of devices 102 (e.g., one or more devices that have previously obtained certain skills that enable them to perform certain functions requested by other ones of devices 102).

Provider selection modules 118 and/or device agents 114 may, in certain cases, send, to the device included in devices 102 (e.g., via device agents 114), provider information 126 that is associated with these identified provider systems. Provider selection modules 118 and/or device agents 114 may receive, from the device (e.g., via device agents 114) and based on provider information 126, a selection of a provider system from the group of identified provider systems. Device agents 114 and/or payment modules 123 may in some cases also receive, from the device, payment data associated with performance of the function by the provider system, where the payment data identifies a first financial system associated with the device (e.g., with a user of the device such as a customer or an owner). The first financial system may be included in financial service provider systems 106 or financial technology provider systems 110.

Provider selection modules 118 may select a provider system from the group of identified provider systems. In some cases, provider selection modules 118 may perform this selection based on receipt of a selection of the provider system from the device, as noted above. However, in certain other cases, and as will be described in further detail below, provider selection modules 118 may perform this selection based on its own identification of a selected provider system, without receiving input from the device. For example, provider selection modules 118 may use existing information included in one or more of provider information 126, device information 128, performance information 130, and/or smart contract information 132 to select a particular provider system for performance of a requested function.

Management system 108 may send, to the selected provider system (e.g., via provider proxies 116), the request to perform the function. Responsive to sending the request to the selected provider system, management system 108 may receive, from the provider system (e.g., via provider proxies 116), provider response information associated with performance of the function to provide at least one of the one or more services, goods, or device skills, which may in some cases be stored in performance information 130 and/or provider information 126. Management system 108 may send, to the device (e.g., via device agents 114), the provider response information associated with performance of the function.

Payment modules 123 may initiate payment of funds (e.g., digital currency) from the first financial system associated with the device (e.g., a first financial system associated with a customer or an owner of the device) to the second financial system associated with the selected provider system. In some cases, payment modules 123 may initiate this payment based on payment data received from the device (e.g., via device agents 114). The first and/or second financial systems may be included in financial service provider systems 106 or financial technology provider systems 110. Payment modules 123 may initiate such payment at a defined payment time period (e.g., in real time, weekly, bi-weekly, etc.).

In some cases, devices 102 may not have information about the types of functions that may be performed by, and/or the capabilities of, providers 106, 110, 112. In these cases, before receiving a particular request from device 102 to perform a function, management system 108 (e.g., using provider proxies 116 and/or provider gateways 124) may receive provider function information from provider systems 106, 110, 112, where the provider function information is associated with one or more functions that are supported by provider systems 106, 110, 112 to provide the one or more services, goods, or device skills. In some cases, this would allow for local storage of pre-filtered services/goods/skills and corresponding contract terms (e.g., in provider information 126, device information 128, performance information 130, and/or smart contract information 132), so they can be pre-setup and executed with provider systems 106, 110, 112 without necessarily having to go through an entirety of a selection process or negotiation/agreement to contract terms each time. Device agents 114 may then send to device 102 (e.g., in response to a request from device 102) this provider function information.

For instance, device 102 may send a request via device agents 114 to obtain this provider function information, including information about the types of functions that may be performed, and/or the capabilities provided, by management system 108 and/or provider systems 106, 110, 112. Management system 108 may provide devices 102 with the provider function information, which may include various types of information about providers 106, 110, 112 and/or other ones of devices 102, including the types of functions that are provided or otherwise supported by providers 106, 110, 112 and/or other devices 102, as well as any parameters that are associated therewith. This provider function information may also be stored in provider information 126.

Using this provider function information, devices 102 may then determine which function requests to generate, including any associated input parameter values included in these requests. Devices 102 may then send management system 108 one or more requests to perform functions (e.g., via device agents 114), where these functions are included in the one or more functions associated with the provider function information. These requests may include associated parameter values in order request performance of the requested functions. In some cases, the parameter values may relate to or specify requested performance, accuracy, deliverables, ratings, reliability, dates, pricing, and/or other criteria associated with the requested functions. In various examples, provider selection modules 118 may identify candidate provider systems by identifying one or more of provider systems 106, 110, 112 based on the request from client device 102 and based on the provider function information.

As noted above, management system 108 may serve or provide an ad-hoc digital marketplace or repository for functions that are offered by these provider systems 106, 110, 112 or certain ones of devices 102, including any systems or devices that are available as resources to perform provider (e.g., vendor) functions. As such, management system 108 operates as a multi-function capability organizer between devices 102 and provider systems 106, 110, 112. Management system 108 may thereby be configured to manage the distribution of goods, services, and/or skills associated with the respective functions to the appropriate entities (e.g., devices 102 or other systems). Management system 108 may also, in some cases, may maintain a whitelist or other trustworthiness metric for devices 102 and/or provider systems 106, 110. 112 within device information 128 and/or provider information 126.

To populate provider information 126, management system 108 may receive portions of provider information 126, via provider proxies 116, from provider systems 106, 110, 112. In such fashion, provider systems 106, 110, 112 may advertise the types of functions or other capabilities that are respectively supported by these systems, and which may be requested by devices 102. Similarly, to populate device information 128, management system 108 may receive portions of device information 128, via device agents 114, from devices 102. One or more of devices 102 are thereby able to advertise the types of functions that they support and that may be requested by other ones of devices 102.

As noted previously, negotiation modules 122 may be configured to perform negotiation operations (e.g., bidding operations, auction operations) between devices 102, management system 108, and/or provider systems 106, 110, 112 associated with the performance of various functions. In various examples, provider selection module 118 may interact with negotiation modules 122 to perform such negotiation operations with candidate provider systems 106, 110, 112 via corresponding ones of provider proxies 116, or even with one or more of devices 102 via corresponding device agents 114, as part of the process of selecting a provider system for performing a requested function. For example, negotiation modules 122 may conduct one or more auctions or otherwise enable bidding by candidate provider systems 106, 110, 112 and/or devices 102 to provide services, goods, and/or skills while performing functions requested by one or more of devices 102. Provider selection modules 118 may select a provider system (e.g., one of provider systems 106, 110, 112 and/or one or more of devices 102) based on the information (e.g., results) associated with the auction and/or bidding operations. In some cases, provider selection modules 118 may perform this selection further based on parameter values provided by device agents 114 with the function requests initiated by devices 102. As indicated previously, these parameter values may specify selection criteria related, e.g., to performance, accuracy, deliverables, ratings, reliability, dates, pricing, and/or other criteria associated with the functions that are requested by devices 102.

Negotiation modules 122 may, in various examples, store the details or data associated with smart contracts between devices 102 and one or more of providers 106, 110, 112 and/or with management system 108 within smart contract information 132. For example, based upon the bidding and/or negotiation of services with devices 102, negotiation modules 122 may create smart contacts (e.g., software/code contracts, legal contracts) between devices 102, one or more of providers 106, 110, 112, and/or management system 108 directly, which bind these entities to the terms of these contracts with respect to functions performed. In some cases, the smart contracts may include information associated with bidding or auction operations. For example, a smart contract may include at least a portion of the information associated with the bidding or auction operations for a provider system selected by provider selection modules 118. Negotiation modules 122 may store the terms of these smart contracts within smart contract information 132.

FIG. 1 also shows that management system 108 includes confirmation modules 127 and resolutions modules 129, which may be invoked prior to execution of payment modules 123. Negotiation modules 122 may set the various negotiated or otherwise determined terms or conditions as outlined above, which are associated with performance of functions and commitments to pay for services/goods/skills associated with these functions, and these terms may be captured in smart contracts stored in smart contract information 132. These smart contracts are associated with the performance of these functions. Negotiation modules 122 may also set the negotiated or otherwise determined resolution information associated with requested functions, and this resolution information may also be captured in the smart contracts stored in smart contract information 132. The use of confirmation modules 127, resolution modules 129, and/or payment modules 123 may provide a feedback loop in order to confirm satisfactory completion of requested functions to provide goods, services, and/or skills in accordance with the terms and conditions included in the smart contracts, prior to initiation of payment.

For example, confirmation modules 127 may be configured to confirm satisfactory completion by a provider system 106, 110, 112 in performing a function in accordance with the negotiated terms or conditions, and may then trigger payment modules 123 to initiate payment of funds upon confirmation modules 127 determining that the provider system has performed the function in accordance with the terms or conditions. However, if confirmation modules 127 determine that the provider system has not performed the function in accordance with the terms or conditions (e.g., an unsatisfactory completion if service is interrupted or does not meet the negotiated terms, or if errors occur), resolution modules 129 may perform resolution operations (e.g. based on the resolution information in smart contract information 132). For instance, resolution modules 129 may abort operations and invoke an alternative service provided by management system 108, or resolution modules 129 may initiate a corrective loop by triggering confirmation modules 127.

As one example, based on the resolution information, resolution modules 129 may in some cases modify one or more parameters or values associated with performance of the requested function to provide goods/services/skills, and/ or select a different one of provider systems 106, 110, 112. Resolution modules 129 may then invoke confirmation modules 127 to confirm satisfactory completion. After resolution modules 129 have performed the resolution operations, and responsive to confirmation modules 127 determining that the provider system has performed the function in accordance with the terms or conditions (e.g., upon satisfactory completion and resolution of any errors or other issues), confirmation modules 127 and/or resolution modules 129 may invoke payment modules 123 to initiate payment of funds. Confirmation modules 127, resolution modules 129, and/or payment modules 123 may each access smart contract information 132 to reference terms, conditions, resolution information, etc. during performance of their respective operations.

In addition, management system 108 may be configured to initiate or coordinate the payment of funds associated with performed functions between financial systems associated with devices 102 and/or provider systems 106, 110, 112. Payment modules 123 of management system 108 may be configured to perform payment operations, such as the initiation or coordination of fund payments between provider systems 106, 110 112 and devices 102 for the performance of functions, as described in further detail below. Payment modules 123 may access performance information 130 and/or smart contract information 132 when managing payment operations, and may determine payment information (e.g., amounts of payment) based on performance information and/or smart contracts included in smart contract information 132. Performance information 130 may include metrics or other information associated with performance or non-performance of functions by provider systems 106, 110, 112 and/or devices 102, such as information related to performance efficiency, timing, accuracy, reliability, pricing, and the like. In some examples, management system 108 communicates with provider gateways 124 (e.g., banking or payment gateways) to manage distribution or disbursement of funds for the different functions to the appropriate entities. Provider gateways 124 may be included within or may be external to management system 108 in different examples. Provider gateways 124 may provide an interface to any number of different providers, such as to one or more of financial service provider systems 106 or financial technology provider systems 110. Although FIG. 1 shows provider systems 112 (e.g., vendor systems) being separate from financial service provider systems 106 and financial technology provider systems 110, each of provider systems 112 may be associated with and/or owned by one of financial service provider systems 106 or financial technology provider systems 110.

Devices 102 may communicate directly with management system 108 (e.g., with one or more of the modules included in management system 108) or via device agents 114. In some cases, device agents 114 may act under the direction or control or devices 102, or may act as proxies for devices 102. Similarly, provider systems 106, 110, 112 may communicate directly with management system 108 (e.g., with one or more of the modules included in management system 108) via respective provider proxies 116.

As noted earlier, devices 102 may insert or otherwise include one or more input parameter values within any given function request that is submitted to management system 108. These parameter values may be associated with a function and may be particular variable values that are specified by devices 102 for performance of the requested function. For example, if a device sends a task request to perform a cash withdrawal function, the device may include one or more parameter values in the request associated with this requested function. For instance, the parameter values may specify the identity of the user of the device (e.g., customer or owner of an ATM device or digital cash register), the financial service provider system of systems 106 that is associated with the device, the amount of requested cash withdrawal, and the like.

In some examples, the group of provider systems 106, 110, 112 and/or devices 102 identified by provider selection modules 118 may be physical devices, virtual machines, and/or software running on physical devices. As noted above, provider systems 106, 110, 112 may be associated with corresponding provider proxies 116. In a scenario in which one or more of provider systems 106, 110, 112 becomes unavailable, provider proxies 116 may serve as proxy devices for these unavailable providers until such time as they subsequently become available once again, or until other ones of provider systems 106, 110, 112 providing the same or similar functions are identified. Any changes of provider systems 106, 110, 112 during their execution may be seamless and with no interruption of service to devices 102 or other provider systems within distributed computing system 100. Resolution modules 129 may, in various cases, monitor or control the interfaces to provider systems 106, 110, 112 via provider proxies 116 to manage this seamless execution. In various examples, provider selection modules 118 may identify particular ones of provider systems 106, 110, 112 and/or devices 102 that have existing capabilities to perform requested functions, as well as high trust or performance ratings as indicated in performance information 130.

Device information 128 stored in management system 108 may contain further data associated with devices 106, and provider information 126 may contain further data associated with provider systems 106, 110, 112. For example, provider information 126 may include identifiers, address data, cost information, rating information, quality information, current availability/bandwidth information, and/or other associated metadata associated with provider systems 106, 110, 112, and device information 128 may include similar information associated with devices 102. In various examples, device information 128 and/or provider information 126 may include one or more of trustworthiness information, rating information, quality information, and/or price information associated with functions performed by devices 102 and/or provider systems 106, 110, 112. In these examples, as these entities perform functions over time, other devices or systems may provide feedback associated with trustworthiness, ratings, quality, etc., associated with the functions performed by these entities. Management system 108 may store such information within device information 128 and/or provider information 126.

Provider selection modules 118 may access provider information 126 and/or device information 128 to identify and select one or more of provider systems 106, 110, 112 and/or devices 102 to perform requested functions. In certain examples, if provider selection modules 118 identify more than one entity as being capable of performing a requested function, provider selection modules 118 may select one of the entities having a highest trust level or rating associated with the requested function, based on information included in provider information 126 and/or device information 128, such as ratings associated with capabilities, trustworthiness, performance, accuracy, quality, and/or price, to name only a few examples.

In certain examples, provider selection modules 118 may utilize one or more parameter values included within function requests from devices 102 and/or device agents 114 (e.g., bidding values, task/capability values, performance values, accuracy values, cost values, quality values), and provider selection modules 118 may then identify one or more provider systems 106, 110, 112 and/or devices 102 (e.g., based on interaction with devices 102, based on information included in provider information 126 and/or device information 128), in an effort to maximize one or more criteria, such as criteria related to capability, performance, accuracy, ratings, quality, and/or cost. Provider selection modules 118 and/or device agents 114 may then provide an indication (e.g., provider system and/or device identifiers) of the identified providers or devices back to devices 102.

In addition, the results of any functions performed by provider systems 106, 110, 112 and/or devices 102 may be moved to management system 108 (e.g., a blockchain) for verification and tracking purposes such that a transaction history is maintained. For example, device agents 114, confirmation modules 127, and/or payment modules 123 may track functions performance results and provide such results for storage in provider information 126 and/or performance information 130.

Payment modules 123 and/or device agents 114 may collect payment from devices 102 or any financial system associated with devices 102 (e.g., one of financial service provider systems 106 or financial technology provider systems 110), in order to pay one or more of other devices, provider systems 106, 110, 112 and/or provider systems (e.g., financial systems) associated with these entities. In some cases, payment modules 123 may initiate payment based on payment data that is received from devices 102, where the payment data identifies a financial system associated with devices 102, such as with a user (e.g., owners or customers) of devices 102. Payment modules 123 may initiate or coordinate payment of funds at one or more defined payment time periods (e.g., in real-time, weekly, biweekly or monthly). Payment modules 123 may use or communicate with management system 108 (e.g., in a blockchain), and/or access performance information 130 or smart contract information 132, to determine the amount owed to each entity during execution, or at the completion of execution. In some examples, built-in checkpoints may be used for the functions and/or payments based on performance metrics (e.g., accuracy, quality, timeliness, etc.) at that checkpoint, as indicated in performance information 130. As one example, one or more blocks in the blockchain provided by provider information 126, device information 128, and/or performance information 130 of management system 108 may include: device or provider information with capabilities and some rating, device or provider system availability, device or provider system contribution or performance (e.g., entered every n seconds). These blocks may then, e.g., be validated by consensus depending on origin and use. This may be more than a standard blockchain consensus of confirming that transactions are recorded.

In some examples, one or more machine learning modules provided by management system 108 may include one or more an artificial intelligence (AI) or deep learning engines capable of analyzing a large volume of data to assist with the performance of one or more modules, agents, gateways, proxies, or other entities of management system 108. These machine learning modules may also be configured to continuously learn which criteria are more important, or have higher weight, based on device information 128, performance information 126, and/or performance information 130, and may correspondingly update respective machine learning models maintained by management systems 108.

Figure 2:
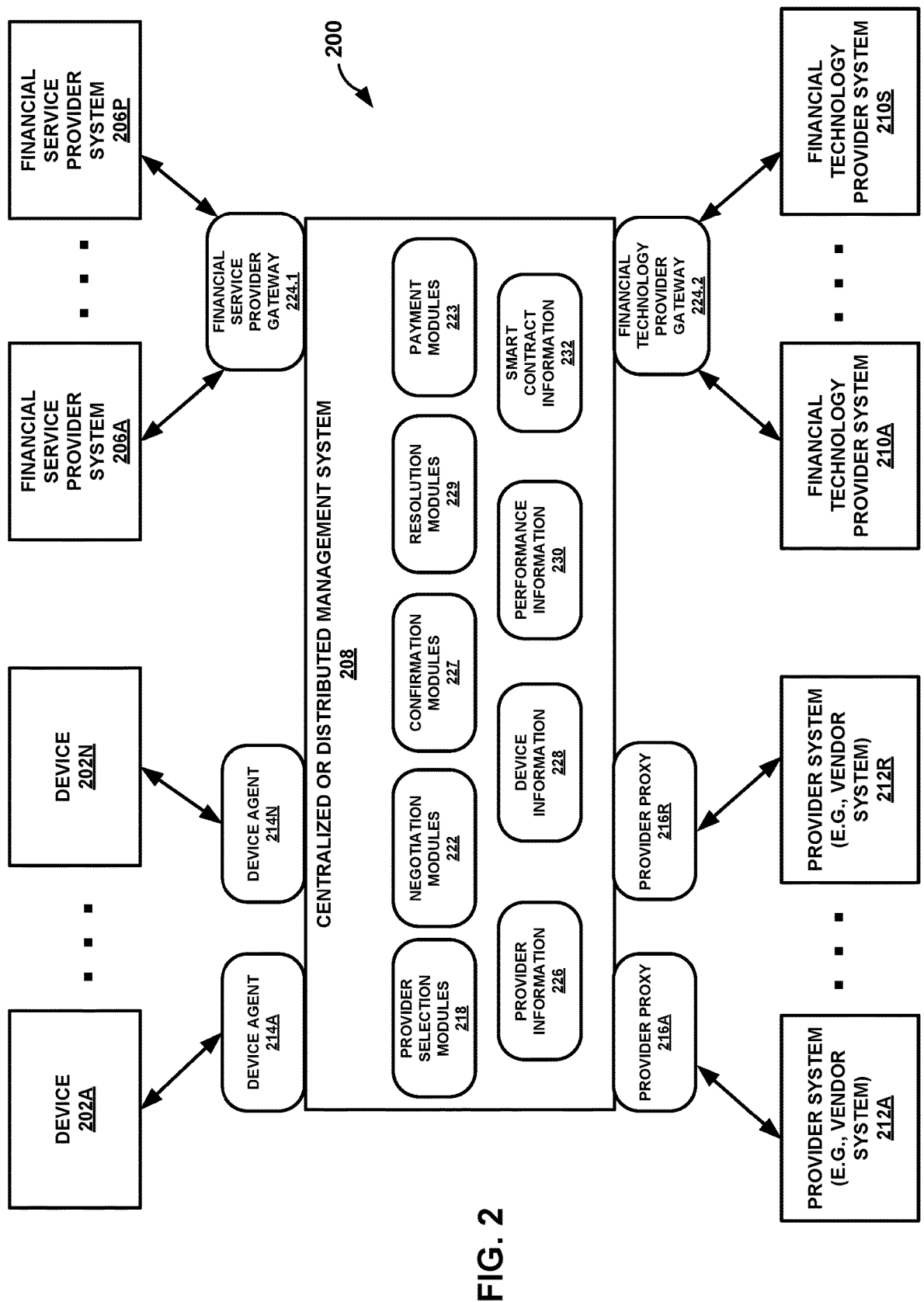
FIG. 2 is a block diagram illustrating an example of the management system shown in FIG. 1, which is configured to interact with devices and provider systems, in accordance with techniques of this disclosure.

FIG. 2 is a block diagram illustrating an example of the system shown in FIG. 1, which is configured to interact with devices and provider systems, in accordance with techniques of this disclosure. In this example, which includes a distributed computing system 200, various elements shown in FIG. 2 may have similar functionality to similarly numbered elements shown in FIG. 1. Thus, similar to centralized or distributed management system 108 of FIG. 1, centralized or distributed management system 208 of FIG. 2 includes one or more provider selection modules 218, negotiation modules 222, payment modules 223, confirmation modules 227, resolution modules 129, provider information 226, device information 228, performance information 230, and smart contract information 232. Management system 208 may be one example of management system 108.

In the example of FIG. 2, management system 208 is communicatively coupled to devices 202A-202N (collectively, "devices 202"), financial service provider systems 206A-206P (collectively, "devices 206"), financial technology provider systems 210A-210S (collectively, "devices 210"), and other provider systems (e.g., vendor systems) 212A-212R (collectively, "provider systems 212") via one or more networks (not shown), such as networks 104 of FIG. 1. Devices 202 may be one example of devices 102, and devices 202 may each be communicatively coupled to or include a device agent included in device agents 214A-214N (collectively, "device agents 214"). For instance, device 202A may be communicatively coupled to or include device agent 214A, and device 202N may be communicatively coupled to or include device agent 214N. Although not indicated in FIG. 2, in some cases, any given device agent of device agents 214 may be coupled to more than one of devices 202. In various examples, device agents 214 may be part of or provided by management system 208. These device agents 214 may be one example of device agents 114 shown in FIG. 1.

Financial service provider systems 206 may be one example of financial service provider systems 106. Financial service provider systems 206 may each be communicatively coupled to a financial service provider gateway 224.1 (e.g., one example of provider gateways 124). In various examples, financial service provider gateway 224.1 may be part of or provided by management system 208.

Financial technology provider systems 210 may be one example of financial technology provider systems 110. Financial technology provider systems 210 may each be communicatively coupled to a financial technology provider gateway 224.2 (e.g., another example of provider gateways 124). In various example, financial technology provider gateway 224.2 may be part of or provided by management system 208.

Other provider systems 212 may be one example of provider systems 112, and provider systems 212 may each be communicatively coupled a provider proxy included in provider proxies 216A-216R (collectively, "provider proxies 216"). For instance, provider system 212A may be communicatively coupled to provider proxy 216A, and provider system 212R may be communicatively coupled to provider proxy 216R. In various examples, provider proxies 216 may be part of or provided by management system 208. These provider proxies 216 may be one example of provider proxies 116 shown in FIG. 1.

As one illustrative example, device 202A may be a machine that, in conjunction with device agent 214A, may operate as a multi-function cash register capable of performing different functions (e.g., cash register, card reader, automated teller machine (ATM), etc.), which each may be associated with a respective one of financial service provider systems 206 (e.g., a system associated with a bank or credit union) or financial technology provider systems 210.

In one scenario, similar to the one described above in reference to FIG. 1, this multi-function cash register may have access, via management system 208, to different financial service functions (e.g., cash withdrawal, deposit, fund transfer, etc.) provided by financial service provider systems 206 and/or financial technology provider systems 210. In this scenario, the multi-function cash register may select the appropriate financial service function to perform based on a type of function requested by a customer of device 202A and the customer's financial institution.

For example, device 202A may initially use device agent 214A send management system 208 a request for provider function information that indicates a group of functions that are supported or provided by financial service provider systems 206 and/or financial technology provider systems 210 to provide one or more services (e.g., cash register services, fund transfer services, card reader services, ATM services for cash withdrawal/deposit), goods, or device skills. In response to this request, management system 208 may send such provider function information to device 202A via device agent 214A. Management system 208 may have previously obtained this provider function information from financial service provider systems 206 and/or financial technology provider systems 210, and stored the provider function information in provider information 226. In other examples, a user identifier could provide for a secure, real-time negotiation or determination that the identifier exists and that there is an active account to support the request. Then, authentication would be performed to initiate the requested action.

After authentication and/or authorization, device 202A may indicate (e.g., output for display) these supported functions to a customer of device 202A. The customer may then select any of these functions. For instance, if the customer of device 202A wants to perform a cash withdrawal, device 202A, device 202A uses device agent 214A to send a request to perform this function to management system 208. Upon receiving the request, provider selection modules 218 may identify which provider systems 206, 210 are configured to perform the function. In some cases, the request may include information about which financial system is associated with the customer (e.g., based on user input or input provided via an ATM card), as well as information about the customer (e.g., name, customer identifier, code, personal identification number (PIN), quick response (QR) code, etc.). For example, the request may indicate that financial service provider system 206A is associated with this customer. In some cases, if provider selection modules 218 determine that financial service provider system 206A is currently available via the network and supports the requested function, provider selection modules 218 may identify provider system 206A as a candidate provider system. In some cases, provider selection modules 218 may identify any of provider systems 206 and/or 210 that support the requested function, and identify any of such systems as candidate provider systems. Provider selection modules 218 may then in some cases send provider information 226 associated with these candidate provider systems to device 202A via device agent 214A.

In some cases, when a user is using an out-of-network ATM, provider selection modules 218 may select one of provider systems 206 and/or 210 (e.g., partner bank) that will process the ATM request to the user's home financial service provider (e.g., financial service provider system 206A). In an alternate case, provider selection modules 218 may enable communication directly with the user's online interface so that the transaction is a direct online debit with payment being provided to the merchant processing the request. For example, this could emulate writing a check, which is automatically turned into a digital equivalent of a check that is directly exchanged between the merchant's bank and the customer's bank (e.g., one or more of provider systems 206, 210) via a real-time transfer, without necessarily involving a financial exchange network.

The provider information may, in some cases, also include financial terms or conditions associated with the requested function. For example, the candidate provider systems may charge a fee associated with the cash withdrawal function. Certain provider systems, such as financial service provider system 206A associated with the customer, may or may not necessarily charge a fee. However, if the customer selects a provider system that charges a fee for the withdrawal, the selected provider system may subsequently interact with financial service provider system 206A to obtain the requested funds via a fund transfer operation. In some instances, the owner of device 202A (e.g., store, merchant location) may also charge a fee to users or customers of device 202A for requesting performance of certain functions.

Device 202A may output (e.g., display) the provider information associated with the provider systems that may be available to provide the cash withdrawal function, including any associated fees. Device 202A may then select one of the provider systems to perform the requested function. For example, the customer (e.g., via user input) may select provider system 206A, and device 202A may use device agent 214A to send this selection to provider selection modules 218. In some cases, device 202A/device agent 214A may also provide payment data or payment authorization (e.g., for charged fees) associated with performance of the function, and this payment data may identify a financial system associated with the customer.

Provider selection modules 218 may then send the request to perform the cash withdrawal function to the selected provider system. For instance, if the selected provider system is provider system 206A, provider selection modules 218 may send the request to provider system 206A via provider gateway 224.1. Provider system 206A may authorize and perform the function based on the provider system associated with the customer and the customer's information. Provider system 206A may then send provider response information back to management system 208 via provider gateway 224.1. This provider response information is associated with the performance of the cash withdrawal function, and may indicate details about the performed function (e.g., identify of provider system 206A, amount of funds withdrawn, date/time of withdrawal), and management system 208 may send this provider response information back to device 202A via device agent 214A. Device 202A may then provide the cash withdrawal to the customer (e.g., via physical withdrawal of funds, via virtual or digital withdrawal of funds onto the customer's preferred/selected card, via virtual or digital withdrawal of funds on the customer's mobile phone via a mobile app or digital wallet). In some cases, payment modules 223 may be configured to perform currency exchange operations, to covert digital from a first digital currency (e.g., Euro) to a second digital currency (e.g., USD).

Payment modules 223 may also manage the distribution of funds for the cash withdrawal function from provider system 206A via provider gateway 224.1. For instance, assuming that there are one or more charges involved for performance of the cash withdrawal function (e.g., a two-dollar fee charge for fifty dollars in cash), payment modules 223 may initiate the payment of funds from a first financial system associated with the customer of device 202A to a second financial system associated with financial service provider system 206A that performed the function and/or to a financial system associated with the owner of device 202A (e.g., if the owner of device 202A charges a fee for requesting performance of the function). As noted above, in some cases, payment modules 223 may be configured to perform one or more digital currency exchange operations, as appropriate (e.g., based on the location of devices 202, predefined preferences, user input requests, and the like). In some cases, the first and second financial systems may be the same, such as when the customer is withdrawing funds directly out of the customer's bank. In some cases, the second financial system may be the same as financial service provider system 206A. However, in some cases, the second financial system may be different than financial service provider system 206A (e.g., may be another one of provider systems 206 or 210).

In a different scenario, device 202A serving as the multi-function cash register may have access, via management system 208, to a version of each different banking function provided by two or more different banks associated with financial service provider systems 206. The merchant (e.g., store) that provides the multi-function cash register may, for example, have an agreement, via management system 208 (e.g., within smart contract information 232), to use cash withdrawal and deposit functions of provider system 206A associated with a first bank, and to use fund transfer function of provider system 206P associated with another bank. In this way, the merchant can agree to use certain functions provided by a certain bank based on the pricing structure and/or services that the bank offers. In this scenario, the multi-function cash register may select the appropriate banking function to perform based on a type of function requested by a customer regardless of the customer's bank. For example, when the customer of the first bank requests a fund transfer function via device 202A using device agent 214A, management system 208 may use provider selection modules 218 to select provider system 206P to perform the fund transfer function. Management system 208 then manages the fund transfer with provider system 206P, and provider system 206P is responsible for reconciling accounts at provider system 206A for the fund transfer.

The marketplace provided by management system 208 may allow device 202A (e.g., a multi-function cash register in this example) to operate essentially as a virtual ATM in which certain ATM functions (e.g., cash deposit) can be used to fund other ATM functions (e.g., cash withdrawal). Management system 208 may use payment modules 223 to ensure that the funds are reconciled with the appropriate financial service providers systems (e.g., financial service provider systems 206 associated with respective financial service providers or institutions, financial technology provider systems 210 associated with respective financial technology providers), which are associated with the customer of device 202A requesting the ATM functions. Beyond cash-based examples, the multi-function cash register may be configured to interact with customer's mobile phone applications to electronically transfer funds to and from, e.g., the customer's bank account associated with one of provider systems 206 or 210.

As one non-limiting example of how payment modules 223 of management system 208 could manage fund distribution/disbursement between financial service providers associated with provider systems 206 and/or financial technology providers associated with provider systems 210, each provider may apply, e.g., a different virtual token to the transactions performed by the multi-function cash register using the functions provided by the respective provider and provider system 206, 210 via management system 208. The transactions along with the virtual tokens may be written to the blockchain or distributed ledger provided by management system 208 (e.g., via one or more of provider information 225, device information 228, and/or performance information 230) and used by management system 208 for, e.g., daily reconciliation or settlement between the providers.

Provider systems 212 may comprise one or more other provider systems that are included in system 200. These provider systems 212 may be associated with providers (e.g., vendors) that provide one or more other types of services, goods, or device skills, which may or may not necessarily be related to financial-based services, goods, or device skills.

As another non-limiting example, device 202A may operate as a self-service kiosk or device capable of performing different functions (e.g., car washing functions, multi-function cash register functions). For instance, when a customer drives to the self-service device 202A and requests a car wash, device 202A may request performance of this function via management system 208, and the request may include information about the customer's car (e.g., make/model). Because there are many different functions that device 202A may be configured to perform, and because there are various different makes and models of cars that may be washed, upon receiving the request from device 202A via device agent 214A, provider selection modules 218 may identify one or more of provider systems 212 that provide car wash functions. In particular, provider selection modules 218 may identify provider systems 112 that provide car wash services or instructions (e.g., skills) as to how to wash cars, and/or particular makes or models of cars.

Based on a selection of one of these provider systems 212, management system 208 may request performance of the function by the selected provider system, including the distribution of services and/or skills to device 202A via device agent 214A. For instance, in some cases, provider selection modules 218 may identify multiple candidate provider systems 212 (e.g., provider system 212A, provider system 212B) that are configured to provide car wash device skills (e.g., instructions) for various different makes/models of cars, including the make/model of car of the particular customer using device 202A. Provider selection modules 218 may send provider information 226 associated with these candidate provider systems 212 to device 202A via device agent 214A, including payment and/or cost information associated with the requested function. In some cases, provider systems 212 may sell such instructions or skills to device 202A. In these cases, device 202A may request performance of a particular function to learn or acquire a skill from provider systems 212, regardless of whether or not a customer is currently using device 202A. In some cases, provider systems 212 may only lease or rent such instructions or skills to device 202A, such as when a customer is currently using device 202A (e.g., currently requesting a car wash).

When provider selection modules 218 sends the provider information to device 202A, device 202A may select one of the candidate provider systems 212. For example, device 202A may select (e.g., automatically or based on input from a customer or owner of device 202A) one of the candidates, and device 202A may then send, via device agent 214A, an indication of this selection to provider selection modules 218. In other alternate cases, provider selection modules 218 may automatically select a candidate provider system without input from device 202A, and without initially sending provider information 226 to device 202A. In these cases, provider selection modules 218 may be configured to select the provider system based on its own analysis of provider information 226 (e.g., provider system providing the best cost or other terms), and/or based on preexisting agreements (e.g., included in smart contract information 232), negotiated with negotiation modules 222 between management system 208 and the selected provider system for the type of requested function.

Upon selection of a provider system, provider selection modules 218 may send a request for performance of the function, and may then receive provider response information from the selected provider system. For example, if provider system 212A is the selected system (referred to as "vendor 212A" of "vendors 212" in reference to this particular example), provider selection modules 218 may send the request for car wash skills or instructions from vendor 212A, including any details in the request for performing the function (e.g., make/model of the car). Vendor 212A may then send provider response information back to provider selection modules 218. This provider response information, which is associated with performance of the requested function, may include device skill information or instructions associated with device skills for washing a particular make/model of a car. Management system 208 may then send this provider response information back to device 202A via device agent 214A. Device 202A may then use the received provider response information to perform a particular service or skill associated with the provider response information (e.g., perform a car wash for the particular make/model of car using car wash equipment that is operatively coupled to device 202A at the owner's or merchant's site).

Payment modules 223 may also initiate payment of funds from a financial system associated with the customer or owner of device 202A to a financial system associated with the selected vendor 212A. In some cases, similar to that described above in reference to FIG. 1, confirmation modules 227 and resolutions modules 229 of FIG. 2 may be invoked prior to execution of payment modules 223. Negotiation modules 222 may set various negotiated or otherwise determined terms or conditions, which are associated with performance of functions and commitments to pay for services/goods/skills associated with these functions, and these terms may be captured in smart contract information 232. Negotiation modules 222 may also set the negotiated or otherwise determined resolution information associated with requested functions, and this resolution information may also be captured in smart contract information 232. The use of confirmation modules 227, resolution modules 229, and/or payment modules 223 may provide a feedback loop in order to confirm satisfactory completion of requested functions to provide goods, services, and/or skills in accordance with the terms and conditions included in the smart contracts, prior to initiation of payment.

For example, confirmation modules 227 may be configured to confirm satisfactory completion by provider system 2016, 210, 212 in performing a function in accordance with the negotiated terms or conditions and may then trigger payment modules 223 to initiate payment of funds upon confirmation modules 227 determining that the provider system has performed the function in accordance with the terms or conditions. However, if confirmation modules 227 determine that the provider system has not performed the function in accordance with the terms or conditions (e.g., an unsatisfactory completion if service is interrupted or does not meet the negotiated terms, or if errors occur), resolution modules 229 may perform resolution operations (e.g., based on the resolution information in smart contract information 232). For instance, resolution modules 229 may abort operations and invoke an alternative service provided by management system 208 (e.g., to request a refund), or resolution modules 229 may initiate a corrective loop by triggering confirmation modules 227.

As one example, based on the resolution information, resolution modules 229 may in some cases modify one or more parameters or values associated with performance of the requested function to provide goods/services/skills, and/or select a different one of provider systems 206, 210, 212. Resolution modules 229 may then invoke confirmation modules 227 to confirm satisfactory completion. After resolution modules 229 have performed the resolution operations, and responsive to confirmation modules 227 determining that the provider system has performed the function in accordance with the terms or conditions (e.g., upon satisfactory completion and resolution of any errors or other issues), confirmation modules 227 and/or resolution modules 229 may invoke payment modules 223 to initiate payment of funds. Confirmation modules 227, resolution modules 229, and/or payment modules 223 may each access smart contract information 232 to reference terms, conditions, resolution information, etc. during performance of their respective operations.

For example, vendor 212A is associated with financial service provider system 206A (e.g., has a bank account in a bank associated with financial service provider system 206A), and the owner of device 202A may be associated with financial service provider system 206B. Payment modules 223 may initiate payment of funds from financial service provider system 206B to financial service provider system 206A for performance of the requested car wash function. In some cases, payment modules 223 may initiate payment of funds from a financial service provider system associated with the customer (e.g., financial service provider system 206P) to financial service provider system 206A associated with vendor for performance of the car wash function. In these cases, device 202A may obtain payment data from the customer (e.g., via payment via cash, payment card, smartphone mobile application, and the like), where the payment data is associated with the requested function, and device 202A may send this payment data to payment modules 223 via device agent 214A. Payment modules 223 may use this payment data to initiate the payment of funds.

In certain cases, the owner (e.g., merchant) of device 202A may pay vendor 212A for the performance of the requested function, and then the customer may pay the owner. In these cases, payment modules 223 may initiate the payment of funds from financial service provider system 206B associated with the owner to financial service provider system 206A associated with vendor 212A. Payment modules 223 may also then initiate the payment of funds from financial service provider system 206P associated with the customer to financial service provider system 206B associated with the owner, including any surcharges or fees charged by the owner or device 202A for allowing the customer to use device 202A. Management system 208 may also store performance information associated with the performance of the requested functions (e.g., quality, timing, cost, performance, etc.) within performance information 230. In some cases, management system 208 may obtain feedback from device 202A when populating this data within performance information 230.

In some cases, the self-service device 202A of this example may also be configured to re-stock certain physical consumables (e.g., soap, wax) and/or currency (e.g., physical or digital currency) used by device 202A or the owner of the device 202A, or other facilities associated with device 202A, via management system 208. For example, over the course of use of device 202A with car wash operations at a merchant site, the car wash facility or equipment may run low on certain consumables, such as soap or wax. To do so, device 202A may utilize management system 208 to identify candidate vendors 212 that may provide such consumables. Device 202A may use device agent 214A to interact with management system 208, similar to that described above, to request performance of the function to provide these consumables (e.g., goods) for use by device 202A.

Upon receiving a request to perform this function from device 202A via device agent 214A, provider selection modules 218 may select one of vendors 212 to perform the requested function (e.g., to provide or re-stock certain consumables). Provider selection modules 218 may use one or more criteria and/or input from device 202A (e.g., based on quality, timing, cost/pricing terms, availability/stock, performance information 230 and/or smart contract information 232), such as described previously above, to select one of vendors 212. Provider selection modules 218 may then send the request to the identified vendor, which may return provider response information back to provider selection modules 218 upon performance of the requested function. For example, this provider response information may indicate which consumable has been ordered, when it will be shipped, cost for order/shipment, and the like, and provider selection modules 218 may send this provider response information back to device 202A via device agent 214A. Payment modules 223 may also initiate payment of funds from the financial system (e.g., bank system) associated with the owner of device 202A to the financial system (e.g., bank system) associated with the selected vendor. In some cases, prior to initiation of payment modules 223, confirmation modules 227 may be configured to confirm receipt of the agreed-upon consumables and authorizing payment via payment modules 223 upon successful confirmation of receipt. However, if confirmation modules 227 does not confirm receipt, confirmation modules 227 may initiate resolution modules 229, which may then be configured to initiate corrective actions (e.g., via request for refund or printing a return shipping label).

In some cases, device 202A may interact with management system 208 to perform this interaction in real time, based upon real-time demand of the requisite consumables, or device 202A may set up a request framework in which it requests certain consumables at defined time periods (e.g., weekly, monthly). In some cases, this framework may also work for a bulk-storage type system or drum, where payment is made for what is used of the consumables in real time, and the supplier of these consumables keeps the drum filled over time.

In some cases, device 202A may rent or lease certain services, goods, and/or device skills from vendors 212. In these examples, payment modules 223 may initiate the payment of funds for the rental or lease of such goods, services, or device skills to device 202A for a defined period of time (e.g., as specified in smart contract information 232). At the end of the period of time, device 202A may no longer use or have access to these goods, services, or device skills (e.g., after the goods, services, or device skills are used for the period of time, such as after a customer-requested car wash is complete). However, in other cases, device 202A may purchase certain services, goods, and/or device skills from provider systems 212. For example, device 202A may purchase the device skill (e.g., instructions) from provider system 212A regarding how to perform a detailed car wash of a particular make/model, luxury car. Payment modules 223 may initiate or coordinate the payment of funds for such a purchase. After the purchase is complete, device 202A may maintain or store this device skill for an indefinite period of time. Device 202A may continue to use this skill without any further interaction with management system 208 or provider systems 212. In fact, at a later point in time, device 202A may itself serve the role of a provider system, and it may rent, lease, and/or sell this acquired skill to another device via management system 208. In such fashion, device 202A may acquire certain services, goods, and/or device skills for either a defined or indefinite period of time, depending on the nature of the transaction. Device 202A may in some cases also be configured to acquire certain goods, services, or skills over time, which it may then potentially provide, as a provider system, to other devices within system 200.

Figure 3:
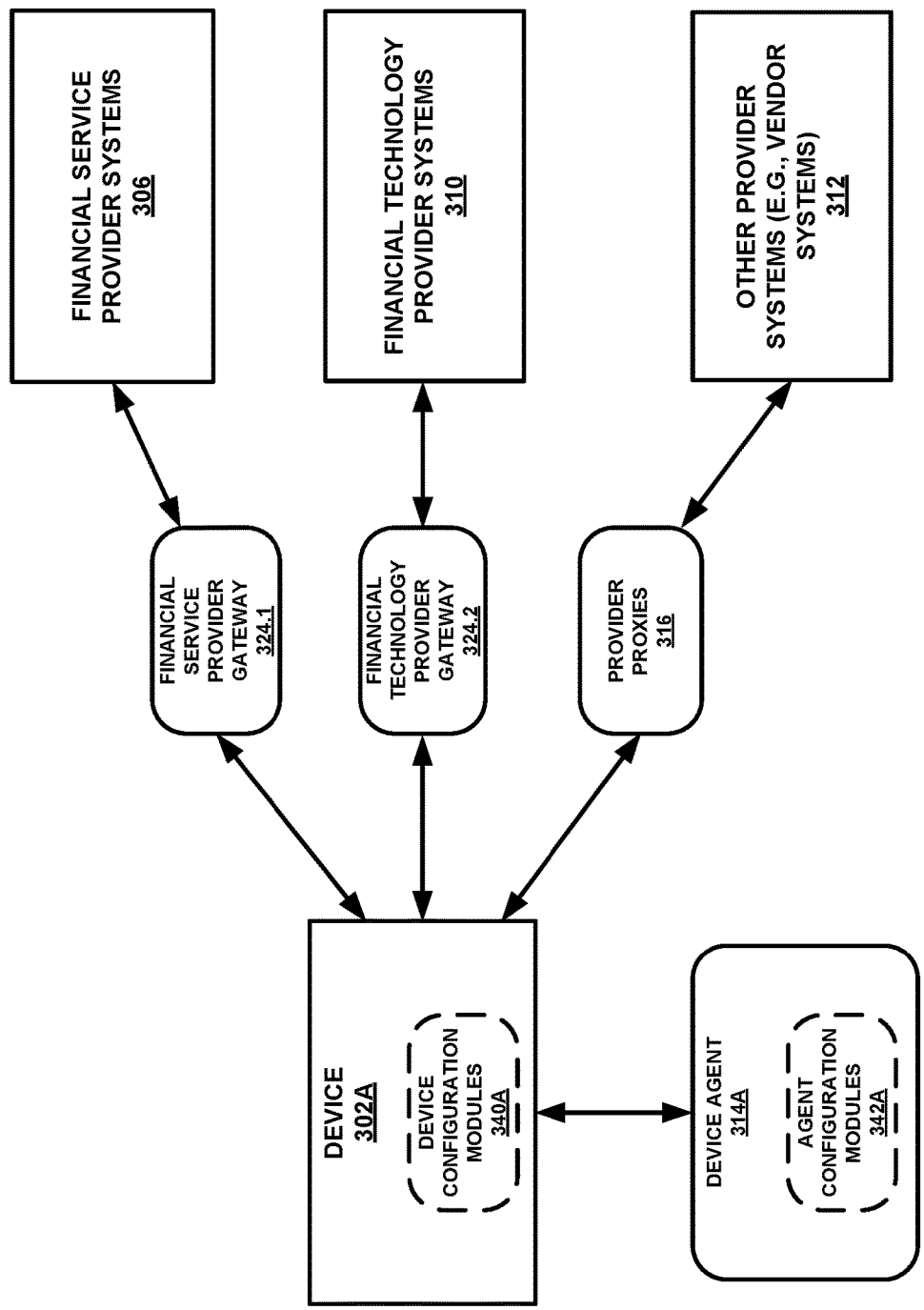
FIG. 3 is a block diagram illustrating an example device and example provider systems, in accordance with techniques of this disclosure.

FIG. 3 is a block diagram illustrating an example device and example provider systems, in accordance with techniques of this disclosure. For example, FIG. 3 shows device 302A that is communicatively coupled to one or more financial service provider systems 306, one or more financial technology provider systems 310, and one or more other provider systems (e.g., vendor systems) 312. Device 302A may be an example of one or more of devices 102 (FIG. 1) and/or devices 202 (FIG. 2). Financial service provider systems 306 may be an example of financial service provider systems 106 (FIG. 1) and/or financial service provider systems 206 (FIG. 2). Financial service provider gateway 324.1 may be one example of provider gateways 124 (FIG. 1) and/or financial service provider gateway 224.1 (FIG. 2). Financial technology provider systems 310 may be an example of financial technology provider systems 110 (FIG. 1) and/or financial technology provider systems 210 (FIG. 2). Financial technology provider gateway 324.2 may be one example of provider gateways 124 (FIG. 1) and/or financial technology provider gateway 224.2 (FIG. 2). Other provider systems 312 may be an example of other provider systems 112 (FIG. 1) and/or provider systems 212 (FIG. 2). Provider proxies 316 may be one example of provider proxies 116 (FIG. 1) and/or provider proxies 216 (FIG. 2).

In various cases, device 302A may communicate with any of provider systems 306, 310, 312 using device agent 314A via one or more networks (e.g., networks 104, not shown in FIG. 3). Device 302A may use device agent 314A to communicate with provider gateways 324.1 and/or 324.2 in order to communicate with financial service provider systems 306 or financial technology provider systems 310 (e.g., to identify or negotiate financial terms or payment details).

Device 302A may use device agent 314A to communicate with provider proxies 316 in order to communicate with other provider systems 312.

In some cases, device agent 314A may be included in or provided by a management system (e.g., management system 108 or 208), and device 302A may communicate with provider systems 306, 310, 312 via device agent 314 using this management system. However, in some cases, device 302A may use device agent 314A to communicate directly with provider systems 306, 310, 312, without using the management system. In these cases, device agent 314A may be provided by one or more computing devices or systems that are not included in the management system. In certain cases, device agent 314A may be included in or provided by device 302A. In some examples, device 302A may use device 314A to initially communicate with the management system (e.g., to identify supported functions by provider systems 306, 310, 312), but may subsequently communicate with provider gateways 324.1, 324.1 and/or provider proxies 316 to communicate directly with provider systems 306, 310, 312 to process function requests for the supported functions, and/or to request or initiate payment functions via provider gateways 324.1, 324.2. In such fashion, device 302A may utilize device agent 314A to communicate with provider systems 306, 310, 312 via provider gateways 324.1, 324.2 and provider proxies 316, either directly or indirectly via the management system.

As shown in FIG. 3, device agent 314A may include one or more optional agent configuration modules 342A. In some examples, device 302A may be device that is preconfigured to perform various functions or tasks, but may not necessarily be preconfigured to communicate with a management system or with provider systems 306, 310, 312. In these examples, device 302A may utilize device agent 314A, where device agent 314A is or becomes configured to communicate with the management system and/or with provider systems 306, 310, 312 via provider gateways 324.1, 324.2 and provider proxies 316. For example, device agent 314A may be configured to send task requests to and receive provider response information from provider systems 306, 310, 312 (e.g., via gateways 324.1, 324.2 and/or provider proxies 316).

In certain cases, device agent 314A may include one or more agent configuration modules 342A, which may be used to dynamically configure device agent 314A and/or device 302A in response to performance of functions to provide services, goods, and/or device skills. By using agent configuration modules 342A, device agent 314A may be enabled as a reconfigurable agent that is capable of configuring device agent 314A and/or device 302A to perform various functions when interacting with provider systems 306, 310, 312, and may maintain certain configurations or capabilities even after such functions are performed. For instance, device agent 314A may use agent configuration modules 342A to dynamically configure device agent 314A to request information as to available services, goods, and/or skills that are supported by or available from provider systems 306, 310, 312. Agent configuration modules 342A may perform further interaction with one or more of provider systems 306, 310, 312 as described previously in reference to FIGS. 1-2 (e.g., to identify best available pricing or negotiate smart contracts), and may configure device agent 314A to request one or more functions from these systems.

For example, agent configuration modules 342A may configure device agent 314A to send one or more requests for the performance of functions from provider systems 306, 310, 312 to provide one or more services, products, and/or device skills. Agent configuration modules 342A may then further configure device agents 314A and/or device 302A based on the requested and obtained services, products, and/or skills. For example, based on the requested services, products, and/or device skills, agent configuration modules 342A may be configured to install or plug in such requested services, products, and/or device skills into device agent 314A and/or device 302A. Each installed service, product, and/or device skill may comprise a plugin that is instantiated by agent configuration modules 342A. Thus, in some cases, each agent configuration module 342A and/or device configuration module 340A in device 302A may correspond to a plugin for one of the installed services, products, and/or device skills. In certain examples, device agent 314A and/or device 302A may remove or uninstall agent configuration modules 342A and device configuration modules 340A after the corresponding services/goods/device skills have been performed or utilized. In other examples, device agent 314A and/or device 302A may maintain agent configuration modules 342A and device configuration modules 340A for corresponding services/goods/device skills, even after these services/goods/device skills have been performed or utilized, as will be described in further detail below.

In some cases, upon performance of certain functions, device agent 314A may maintain certain information regarding the performance of these functions, such that device agent 314A may be enabled to directly communicate with provider gateways 324.1, 324.2 and provider proxies 316 for subsequent interactions (e.g., pricing/payment negotiations for subsequently requested functions). In addition, by maintaining certain information regarding the performance of previously requested functions, device agent 314A may potentially serve as a provider system that may provide or perform that function for other devices or systems within the distributed system, such as described above in reference to the provider systems of FIGS. 1 and 2.

As one example, device agent 314A may use agent configuration modules 342A to request the performance of a certain function by one of provider systems 306, 310, 312 to provide a particular skill. This skill could be associated with skill information. Upon performance of this function by the provider system, and obtaining the skill information associated with this skill, agent configuration modules 342A may store this skill information in device agent 314A, such that device agent 314A has acquired the skill associated with such information. Agent configuration modules 342A may configure device agent 314A based on this learned skill, and device agent 314A may subsequently be capable of serving as a provider system in its own right to advertise this skill (e.g., an enhanced or learned skill, a base skill supplemented with further skills), along with associated costs/payment terms via the management system (e.g., management system 108 or 208), and provide this skill to other devices in the distributed system, similar to other provider systems described in reference to FIGS. 1 and 2. Device agent 314A may be associated with one or more of financial service provider systems 306 or financial technology provider systems 310 to enable payment for performance of functions to provide this skill to other devices in the distributed system.

As also shown in FIG. 3, in some examples, device 302A may itself include one or more device configuration modules 340A. Device configuration modules 340A may have functionality similar to that of agent configuration modules 342A, except that device configuration modules 340A may configure device 302A. In these examples, device 302A may not comprise a preconfigured device that performs only predefined functions. Instead, in these examples, device 302A may comprise a reconfigurable device that device configuration modules 340A may configure to perform various functions based on interactions with provider systems 306, 310, 312. Device configuration modules 340A may configure device 302A similar to the way in which agent configuration modules 342A may configure device agent 314A.

Figure 4:
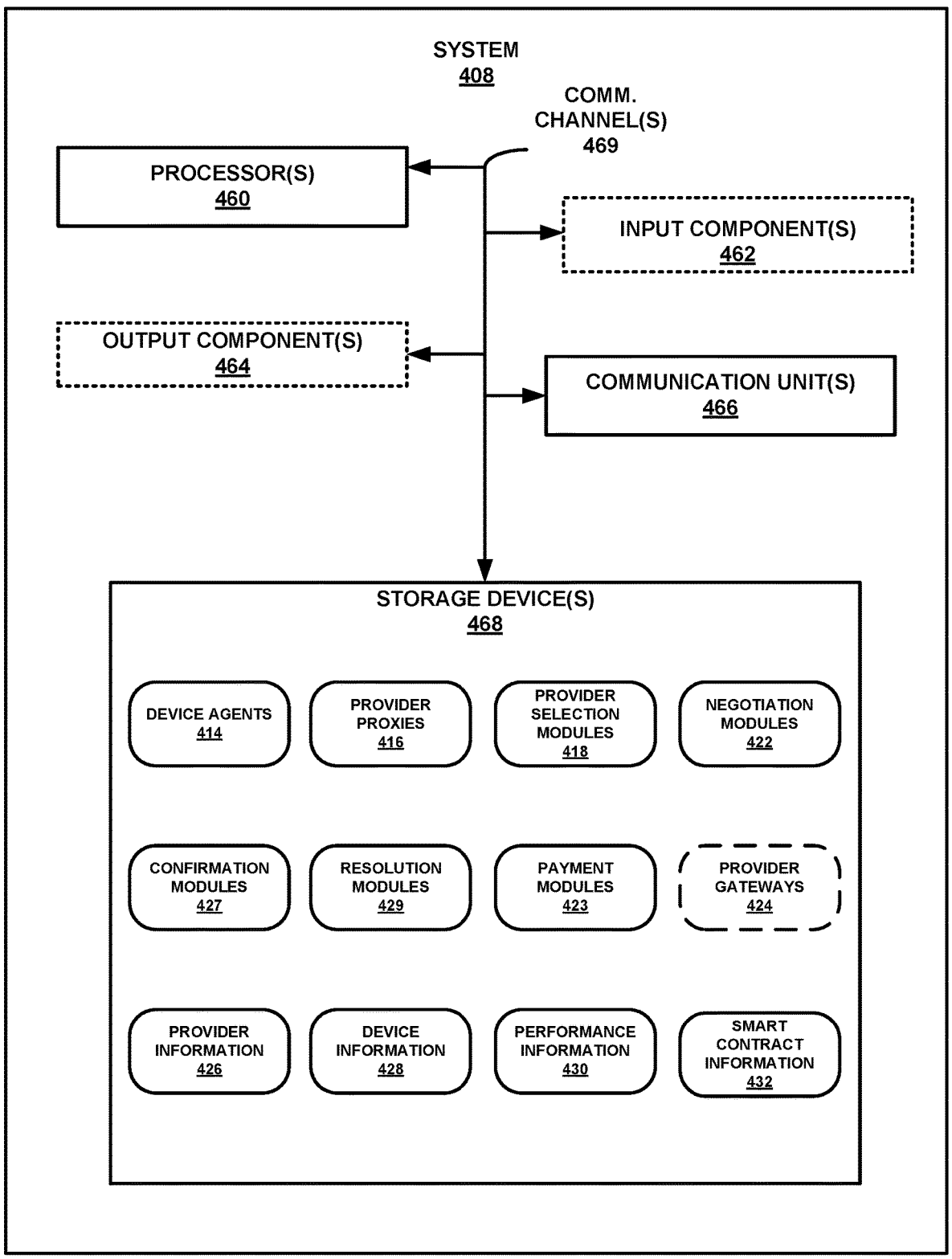
FIG. 4 is a block diagram illustrating further details of an example management system, such as the management system shown in FIG. 1 and/or FIG. 2, in accordance with techniques of this disclosure.

FIG. 4 is a block diagram illustrating further details of an example system 408, in accordance with techniques of this disclosure. System 408 shown in FIG. 4 may be one example of management system 108 (FIG. 1) and/or management system 208 (FIG. 2).

As illustrated, system 408 includes one or more processors 460, one or more optional input components 462, one or more communication units 466, one or more optional output components 464, and one or more storage devices 468. Communication channels 469 may interconnect each of the components 460, 462, 464, 466, and 468 for inter-component communications (physically, communicatively, and/or operatively). In some examples, communication channels 469 may include a system bus, a network connection, an inter-process communication data structure, or any other method for communicating data between hardware and/or software.

One or more input components 462 of system 408 may receive input. Examples of input are tactile, audio, and video input. Examples of input components 462 include a presence-sensitive screen, touch-sensitive screen, mouse, keyboard, voice responsive system, video camera, microphone or any other type of device for detecting input from a human or machine.

One or more output components 464 of system 408 may generate output. Examples of output are tactile, audio, and video output. Examples of output components 464 include a presence-sensitive screen, sound card, video graphics adapter card, speaker, cathode ray tube (CRT) monitor, liquid crystal display (LCD), or any other type of device for generating output to a human or machine. Output components 464 may include display devices such as cathode ray tube (CRT) monitor, liquid crystal display (LCD), or any other type of device for generating tactile, audio, and/or visual output.

One or more communication units 466 of system 408 may communicate with one or more other devices via one or more networks by transmitting and/or receiving network signals on the one or more networks. Examples of communication units 466 include a network interface card (e.g. such as an Ethernet card), an optical transceiver, a radio frequency transceiver, or any other type of device that can send and/or receive information, such as through a wired or wireless network. Other examples of communication units 466 may include short wave radios, cellular data radios, wireless Ethernet network radios, as well as universal serial bus (USB) controllers.

One or more storage devices 468 within system 408 may store information for processing during operation of system 408 (e.g., system 408 may store data accessed by one or more modules, processes, applications, or the like during execution). In some examples, storage devices 468 on system 408 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, storage devices 468 may include redundant array of independent disks (RAID) configurations and one or more solid-state drives (SSD's).

Storage devices 468, in some examples, also include one or more computer-readable storage media. Storage devices 468 may be configured to store larger amounts of information than volatile memory. Storage devices 468 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 468 may store program instructions and/or data associated with one or more software/firmware elements or modules.

For example, when system 408 comprises an example of management system 108 shown in FIG. 1, storage devices 468 may store instructions and/or data associated with one or more of device agents 414, provider proxies 416, provider selection modules 418, negotiation modules 422, payment modules 423, confirmation modules 427, resolution modules 429, optional provider gateways 424, provider information 426, device information 428, performance information 430, and/or smart contract information 432. These may be examples of similarly named components shown in FIG. 1. In other examples, these may be examples of similarly named components of management system 208 (FIG. 2).

System 408 further includes one or more processors 460 that may implement functionality and/or execute instructions within system 408. For example, processors 460 may receive and execute instructions stored by storage devices 468 that execute the functionality of the elements and/or modules described herein. These instructions executed by processors 460 may cause system 408 to store information within storage devices 468 during program execution. Processors 460 may also execute instructions of the operating system to perform one or more operations described herein.

Figure 5:
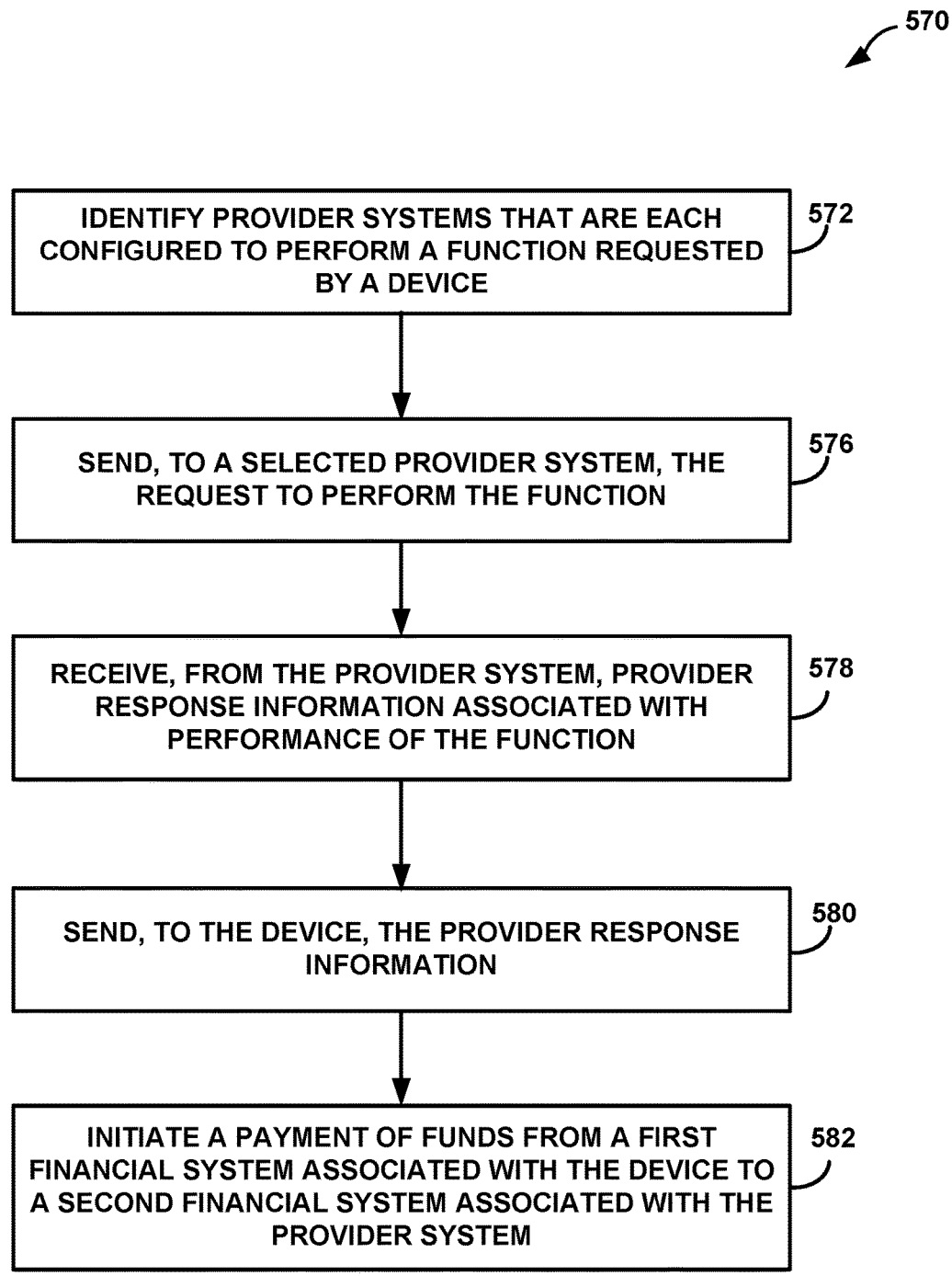
FIG. 5 is a flow diagram illustrating example operations performed by a management system, in accordance with techniques of this disclosure.

FIG. 5 is a flow diagram illustrating example operations to manage devices to perform tasks, in accordance with techniques of this disclosure. As indicated in the example of FIG. 5, example process 570 includes operations 572, 576, 578, 580, and 582. A management system, such as management system 108 (FIG. 1), management system 208 (FIG. 2), and/or system 408 (FIG. 4) may perform these operations. For purposes of illustration only, in the description of FIG. 5 below, it will be assumed that management system 108 performs the recited operations.

Responsive to receiving a request from a device (e.g., one of devices 102) to perform a function, management system 108 (e.g., using provider selection modules 118) may identify (572) a plurality of provider systems (e.g., provider systems 106, 110, and/or 112) that are each configured to perform the function, where the plurality of provider systems are associated with a plurality of vendors that provide one or more services, goods, or device skills. The request to perform the function is associated with at least one of the one or more services, goods, or device skills Responsive to selecting a provider system from the plurality of provider systems, management system 108 (e.g., using provider proxies 116 and/or provider gateways 124) may send (576), to the provider system, the request to perform the function. After sending the request to the provider system, management system 108 (e.g., using provider proxies 116 and/or provider gateways 124) may receive (578), from the provider system, provider response information that is associated with performance of the function to provide the at least one of the one or more services, goods, or device skills.

Management system 108 (e.g., using device agents 114) may send (580), to the device, the provider response information. Management system 108 (e.g., using payment modules 123) may also initiate (582) a payment of funds from a first financial system (e.g., one of financial service provider systems 106 or financial technology provider systems 110) associated with the device (e.g., a customer, an owner of the device) to a second financial system (e.g., one of financial service provider systems 106 or financial technology provider systems 110) associated with the provider system that performed the function.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random access memory (RAM), read-only memory (ROM), electrically erasable and programmable ROM (EEPROM), compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application-specific integrated circuits (ASICs), field-programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   sending, by a device to a management system via a network, a request to perform a function associated with a device skill that the device does not have;
   receiving, by the management system comprising one or more processors via a device agent of the management system that is in communication with the device, the request from the device to perform the function;
   responsive to receiving the request, selecting, by the management system, a provider system from a plurality of provider systems that is configured to provide the function, wherein the plurality of provider systems are associated with a plurality of vendors that provide one or more device skills, and wherein the selected provider system is associated with at least one vendor of the plurality of vendors that provides the device skill associated with the function;
   responsive to selecting the provider system from the plurality of provider systems, sending, by the management system via a provider proxy to the provider system, the request to perform the function;
   in response to the request to the provider system, receiving, by the management system via the provider proxy from the provider system, provider response information that includes the device skill comprising instructions for performance of the function;
   in response to receipt of the provider response information, automatically installing, by the device agent of the management system, the device skill into the device thereby instructing the device to perform the function;
   in response to acquiring the device skill, performing, by the device using the device skill, the function; and
   initiating, by the management system via one or more provider gateways, a payment of funds from a first financial system associated with the device to a second financial system associated with the provider system that provided the device skill to perform the function.

2. The method of claim 1, further comprising identifying the plurality of provider systems based on one or more parameter values that are included in the request and that are associated with the function.

3. The method of claim 2, further comprising:
   before receiving the request from the device, obtaining, by the management system, provider function information associated with one or more functions that are supported by the plurality of provider systems to provide the one or more device skills; and
sending, by the device agent of the management system and to the device, the provider function information,
wherein the function is included in the one or more functions, and
wherein selecting the provider system comprises selecting, by the management system and based on the request and on the provider function information, the provider system from the plurality of provider systems.

4. The method of claim 1, further comprising:
sending, by the device agent of the management system and to the device, provider information that is associated with the plurality of provider systems,
wherein selecting the provider system comprises receiving, by the device agent of the management system and from the device, a selection of the provider system from the plurality of provider systems.

5. The method of claim 4, wherein the provider information includes at least one of cost information, rating information, quality information, or current availability information that is associated with the plurality of provider systems in providing the one or more device skills.

6. The method of claim 1, further comprising:
identifying, by the management system and based on performance of the function provided by the provider system, performance information that is associated with the provider system; and
storing, by the management system, the performance information.

7. The method of claim 1, further comprising:
receiving, by the device agent of the management system and from the device, payment data associated with the device skill, wherein the payment data identifies the first financial system associated with the device,
wherein initiating the payment of funds comprises initiating, by the management system via the one or more provider gateways, based on the payment data and at a defined payment time period, the payment of funds from the first financial system to the second financial system.

8. The method of claim 1, further comprising:
creating, by the management system, a smart contract associated with performance of the function provided by the provider system, wherein the smart contract includes terms or conditions that are associated with performance of the function, and wherein the smart contract further includes resolution information; and
determining, by the management system, whether the provider system has provided the device skill including instructions for performance of the function in accordance with the terms or conditions.

9. The method of claim 8, further comprising:
responsive to determining that the provider system has provided the device skill including instructions for performance of the function in accordance with the terms or conditions, initiating, by the management system, the payment of funds; or
responsive to determining that the provider system has not provided the device skill including instructions for performance of the function in accordance with the terms or conditions:
performing, by the management system based on the resolution information, one or more resolution operations; and
after performing the one or more resolution operations, and responsive to determining that the provider system has provided the device skill including instructions for performance of the function in accordance with the terms or conditions, initiating, by the management system, the payment of funds.

10. The method of claim 1, further comprising:
performing, by the management system, bidding or auction operations associated with a group of candidate provider systems for providing the function; and
before selecting the provider system, selecting, by the management system and based on the bidding or auction operations, the plurality of provider systems from the group of candidate provider systems.

11. The method of claim 10, further comprising:
creating, by the management system, a smart contract associated with performance of the function provided by the provider system, wherein the smart contract includes at least a portion of information associated with the bidding or auction operations; and
storing, by the management system, smart contract information associated with the smart contract.

12. The method of claim 1, wherein initiating the payment of funds comprises initiating, by the management system, a payment of digital currency from the first financial system to the second financial system via the one or more provider gateways.

13. The method of claim 1, wherein:
the first financial system and the second financial system each comprise one of a financial service provider system or a financial technology provider system;
the one or more provider gateways comprise one or more financial service provider gateways or financial technology provider gateways; and
the device comprises a physical or a virtual machine.

14. A system comprising:
at least one device, wherein the device is configured to send, via a network, a request to perform a function associated with a device skill that the device does not have; and
a management system comprising:
one or more processors; and
at least one computer-readable storage device storing instructions that are executable by the one or more processors to:
receive, via a device agent of the management system that is in communication with the device, the request from the device to perform the function;
responsive to receiving the request, select a provider system from a plurality of provider systems that is configured to provide the function, wherein the plurality of provider systems are associated with a plurality of vendors that provide one or more device skills, and wherein the selected provider system is associated with at least one vendor of the plurality of vendors that provides the device skill associated with the function;
responsive to selecting the provider system from the plurality of provider systems, send, via a provider proxy of the management system to the provider system, the request to perform the function;
in response to the request to the provider system, receive, via the provider proxy from the provider system, provider response information that includes the device skill comprising instructions for performance of the function;
in response to receipt of the provider response information, automatically install, by the device agent, the device skill into the device thereby instructing the device to perform the function; and initiate, via one or more provider gateways of the management system, a payment of funds from a first financial system associated with the device to a second financial system associated with the provider system that provided the device skill to perform the function, wherein the device is configured to, in response to acquiring the device skill, perform the function using the device skill.

15. The system of claim 14, wherein the instructions stored on the at least one computer-readable storage device are further executable by the one or more processors to:

before receiving the request from the device, obtain provider function information associated with one or more functions that are supported by the plurality of provider systems to provide the one or more device skills, send, by the device agent to the device, the provider function information, wherein the function is included in the one or more functions, and wherein the instructions stored on the at least one computer-readable storage device are further executable by the one or more processors to select, based on the request and on the provider function information, the provider system from the plurality of provider systems.

16. The system of claim 14, where the instructions stored on the at least one computer-readable storage device are further executable by the one or more processors to:

send, by the device agent to the device, provider information that is associated with the plurality of provider systems, wherein the instructions stored on the at least one computer-readable storage device that are executable by the one or more processors to select the provider system are further executable by the one or more processors to receive, by the device agent from the device, a selection of the provider system from the plurality of provider systems.

17. The system of claim 16, wherein the provider information includes at least one of cost information, rating information, quality information, or current availability information that is associated with the plurality of provider systems in providing the one or more device skills.

18. The system of claim 14, wherein the instructions stored on the at least one computer-readable storage device are further executable by the one or more processors to:

receive, by the device agent from the device, payment data associated with the device skill, wherein the payment data identifies the first financial system associated with the device, wherein the instructions stored on the at least one computer-readable storage device that are executable by the one or more processors to initiate the payment of funds are further executable by the one or more processors to initiate, via the one or more provider gateways, based on the payment data and at a defined payment time period, the payment of funds from the first financial system to the second financial system.

19. The system of claim 14, wherein the instructions stored on the at least one computer-readable storage device are further executable by the one or more processors to:

perform bidding or auction operations associated with a group of candidate provider systems for providing the function; and before selecting the provider system, select, based on the bidding or auction operations, the plurality of provider systems from the group of candidate provider systems.

20. The system of claim 19, wherein the instructions stored on the at least one computer-readable storage device are further executable by the one or more processors to:

create a smart contract associated with performance of the function provided by the provider system, wherein the smart contract includes at least a portion of information associated with the bidding or auction operations; and store smart contract information associated with the smart contract.

21. The system of claim 14, wherein the instructions stored on the at least one computer-readable storage device are further executable by the one or more processors to:

create a smart contract associated with performance of the function provided by the provider system, wherein the smart contract includes terms or conditions that are associated with performance of the function, and wherein the smart contract further includes resolution information; and determine whether the provider system has provided the device skill including instructions for performance of the function in accordance with the terms or conditions.

22. The system of claim 21, wherein the instructions stored on the at least one computer-readable storage device are further executable by the one or more processors to:

responsive to determining that the provider system has provided the device skill including instructions for performance of the function in accordance with the terms or conditions, initiate the payment of funds; or responsive to determining that the provider system has not provided the device skill including instructions for performance of the function in accordance with the terms or conditions:

perform, based on the resolution information, one or more resolution operations; and after performing the one or more resolution operations, and responsive to determining that the provider system has provided the device skill including instructions for performance of the function in accordance with the terms or conditions, initiate the payment of funds.

23. The system of claim 14, wherein to initiate the payment of funds, the instructions stored on the at least one computer-readable storage device are further executable by the one or more processors to initiate a payment of digital currency from the first financial system to the second financial system via the one or more provider gateways, wherein:

the first financial system and the second financial system each comprise one of a financial service provider system or a financial technology provider system;

the one or more provider gateways comprise one or more financial service provider gateways or financial technology provider gateways; and the device comprises a physical or a virtual machine.

24. A non-transitory computer-readable storage device storing instructions that, when executed cause at least one processor to: send, by a device to a management system via a network, a request to perform a function associated with a device skill that the device does not have; receive, via a device agent of the management system that is in communication with the device, the request from the device to perform the function; responsive to receiving the request, select a provider system from a plurality of provider systems that is configured to provide the function, wherein the plurality of provider systems are associated with a plurality of vendors that provide one or more device skills, and wherein the selected provider system is associated with at least one vendor of the plurality of vendors that provides the device skill associated with the function; responsive to selecting the provider system from the plurality of provider systems, send, via a provider proxy of the management system to the provider system, the request to perform the function; in response to the request to the provider system, receive, via the provider proxy from the provider system, provider response information that includes the device skill comprising instructions for performance of the function; in response to receipt of the provider response information, automatically install, by the device agent, the device skill into the device thereby instructing the device to perform the function; in response to acquiring the device skill, perform, by the device using the device skill, the function; and initiate, via one or more provider gateways of the management system, a payment of funds from a first financial system associated with the device to a second financial system associated with the provider system that provided the device skill to perform the function.

\* \* \* \* \*

UNITED STATES PATENT AND TRADEMARK OFFICE
CERTIFICATE OF CORRECTION

Page 1 of 1

PATENT NO. : 11,954,656 B1
APPLICATION NO. : 17/160187
DATED : April 9, 2024
INVENTOR(S) : Andrew J. Garner, IV et al.

It is certified that error appears in the above-identified patent and that said Letters Patent is hereby corrected as shown below:

In the Claims

Column 32, Line 59 (Claim 24): Replace "executed" with --executed,--

Signed and Sealed this
Twenty-first Day of October, 2025

John A. Squires
*Director of the United States Patent and Trademark Office*